T. P. HOWELL & C. P. OLIVER.
MACHINE FOR STRETCHING HIDES.
No. 67,431. Patented Aug. 6, 1867.
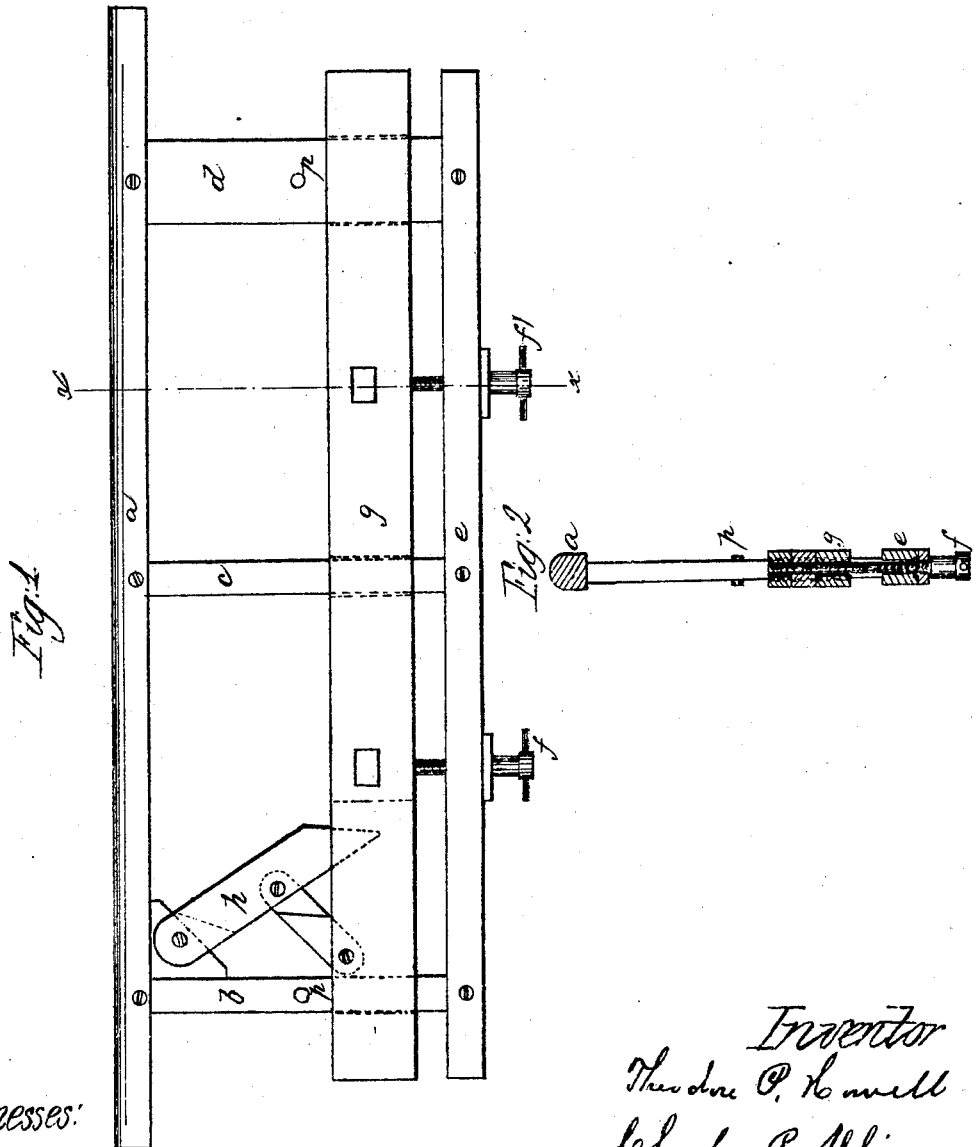

United States Patent Office.

THEODORE P. HOWELL AND CHARLES P. OLIVER, OF ESSEX COUNTY, NEW JERSEY.

Letters Patent No. 67,431, dated August 6, 1867.

---

IMPROVED MACHINE FOR STRETCHING HIDES.

---

*The Schedule referred to in these Letters Patent and making part of the same.*

---

TO WHOM IT MAY CONCERN:

Be it known that we, THEODORE P. HOWELL and CHARLES P. OLIVER, both of the county of Essex, and State of New Jersey, have invented a new and useful Machine for Stretching Hides and Skins; and we do hereby declare that the following is a full, clear, and exact description of the construction and operation of the same, reference being had to the annexed drawings, making a part of this specification, in which—

Figure 1 is a perspective view, and

Figure 2 a transverse section.

$a$ represents a bar of wood, of such size as may be desired, having mortised in it and securely fastened the upright posts $b$, $c$, and $d$, upon which is fitted the movable beam $g$. These posts are again inserted in mortises made in the lower bar $e$, and fastened securely therein. $f$ and $f'$ represent screws extending through the bar $e$ and working in nuts fitted in the beam $g$, as shown in the drawings. $h$ represents a knee fastened at the one end on a block fitted in the angle at the intersection of the bar $a$ and post $b$, and having the upper piece extending into a chamber made in the beam $g$. At the point where the post $b$ intersects the beam $g$ is placed the lower terminus of the knee joining the upper piece, as shown in the drawings.

The hide or skin is placed over the bar $a$, and its edges brought down and tacked or nailed to the sides of the beam $g$. At the same time the one end is fastened in like manner to the post $d$, and the neck part to the upper section of the knee $h$; then, by the action of the screws $f$ and $f'$, the beam $g$ is lowered, stretching the hide or skin perpendicularly, and by the same action the joint of the knee is brought towards the post $b$, stretching the hide or skin laterally. At $p$ and $p'$ in the posts $b$ and $d$ are put stays or pins, extending through the posts, for the purpose of preventing the beam $g$ from being raised above those points, and for the object of having the beam maintain a level position when brought up to them; the machine placed upon cross-beams or other suitable apparatus resting on the ends of the bar $a$, which is made longer than the beam $g$ and bar $e$.

What we claim as our invention, and desire to secure by Letters Patent, is—

A machine for stretching hides or skins, having the bar $a$, posts $b$, $c$, and $d$, bar $e$, screws $f$ and $f'$, beam $g$, and knee $h$, arranged, combined, and operating for the purposes and in the manner hereinabove described.

THEO. P. HOWELL. [L. S.]
CHAS. P. OLIVER. [L. S.]

Witnesses:
DAVID C. DODD,
AMZI J. DEAN.